United States Patent
Sekine et al.

(10) Patent No.: US 9,805,829 B2
(45) Date of Patent: Oct. 31, 2017

(54) LASER FUSION DEVICE AND NUCLEAR FUSION GENERATING METHOD

(71) Applicants: HAMAMATSU PHOTONICS K.K., Hamamatsu-shi, Shizuoka (JP); The Graduate School for the Creation of New Photonics Industries, Hamamatsu-shi, Shizuoka (JP); TOYOTA JIDOSHA KABUSHIKI KAISHA, Toyota-shi, Aichi (JP)

(72) Inventors: Takashi Sekine, Hamamatsu (JP); Takashi Kurita, Hamamatsu (JP); Toshiyuki Kawashima, Hamamatsu (JP); Nakahiro Satoh, Hamamatsu (JP); Hirofumi Kan, Hamamatsu (JP); Yoneyoshi Kitagawa, Hamamatsu (JP); Yoshitaka Mori, Hamamatsu (JP); Katsuhiro Ishii, Hamamatsu (JP); Kazuhisa Fujita, Hamamatsu (JP); Ryohei Hanayama, Hamamatsu (JP); Shinichiro Okihara, Hamamatsu (JP); Atsushi Sunahara, Osaka (JP); Osamu Komeda, Toyota (JP); Naoki Nakamura, Toyota (JP); Yasuhiko Nishimura, Toyota (JP); Hirozumi Azuma, Seto (JP)

(73) Assignees: HAMAMATSU PHOTONICS K.K., Hamamatsu-shi, Shizuoka (JP); TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 277 days.

(21) Appl. No.: 14/434,893

(22) PCT Filed: Oct. 10, 2013

(86) PCT No.: PCT/JP2013/077652
§ 371 (c)(1),
(2) Date: Apr. 10, 2015

(87) PCT Pub. No.: WO2014/061562
PCT Pub. Date: Apr. 24, 2014

(65) Prior Publication Data
US 2015/0270019 A1 Sep. 24, 2015

(30) Foreign Application Priority Data

Oct. 16, 2012 (JP) .................................. 2012-229145

(51) Int. Cl.
G21B 1/00 (2006.01)
H05H 1/22 (2006.01)
(Continued)

(52) U.S. Cl.
CPC ................. $G21B$ $1/03$ (2013.01); $G21B$ $1/15$ (2013.01); $G21B$ $1/19$ (2013.01); $G21B$ $1/23$ (2013.01); $Y02E$ $30/14$ (2013.01); $Y02E$ $30/16$ (2013.01)

(58) Field of Classification Search
CPC ... G21B 1/03; G21B 1/15; G21B 1/19; G21B 1/23
See application file for complete search history.

(56) References Cited

U.S. PATENT DOCUMENTS 4,687,618 A 8/1987 Nuckolls et al.
2011/0261919 A1 10/2011 Sefcik et al.

FOREIGN PATENT DOCUMENTS

CN 101261884 9/2008
CN 102208214 10/2011
(Continued)

OTHER PUBLICATIONS

Norimatsu et al., "Concept of laser fusion power plant based on fast ignition", Proceedings of JSPS-CAS core university program seminar on target materials, vol. NIFS-PROC 70, Feb. 2008, p. 7-p. 13, XP002756364.
(Continued)

*Primary Examiner* — Marshall O'Connor
(74) *Attorney, Agent, or Firm* — Drinker Biddle & Reath LLP

(57) ABSTRACT

A target shell monitoring device 4 that monitors an attitude and a position of the target shell Tg1, a compression laser output device 5a that irradiates the target shell Tg1 with a compression laser light LS1, and a heating laser output
(Continued)

device 6 that irradiates the target shell Tg1 with a heating laser light LS3 following the compression laser light LS1 are provided. The target shell Tg1 has a hollow spherical shell shape, includes an approximately spherical space Sp on an inner side thereof, includes at least one through hole H1 connecting an outer side thereof and the space Sp, and includes, on an outer surface Sf1 thereof, irradiation areas Ar1 and Ar2 to be irradiated with compression laser lights.

6 Claims, 10 Drawing Sheets

(51) Int. Cl.
  *G21B 1/03* (2006.01)
  *G21B 1/15* (2006.01)
  *G21B 1/19* (2006.01)
  *G21B 1/23* (2006.01)

(56) References Cited

FOREIGN PATENT DOCUMENTS

| CN | 102714062 | 10/2012 |
| JP | S52-017789 A | 2/1977 |
| JP | S58-195183 | 11/1983 |
| JP | S59-034187 A | 2/1984 |
| JP | 2005-241462 A | 9/2005 |
| JP | 2009-288229 | 12/2009 |
| WO | WO 2011/080523 | 7/2011 |

OTHER PUBLICATIONS

Osman et al., "Relativistic self focussing of laser beams at fast ignitor inertial fusion with volume ignition", IAEA, 1999, p. 33-p. 34, XP002756365.

Tillack et al., "Target and chamber technologies for direct drive laser inertial fusion energy (IFE)", Pathways to Energy from Inertial fusion: An integrated approach, Apr. 2013, p. 169-p. 175, XP002756367.

R. Kodama et al., "Fast heating scalable to laser fusion ignition," Nature, Aug. 29, 2002, pp. 933-934, vol. 418.

R. Kodama et al., "Fast heating of ultrahigh-density plasma as a step towards laser fusion ignition," Nature, Aug. 23, 2001, pp. 798-802, vol. 412.

H. Shiraga et al., "Fast ignition integrated experiments with Gekko and LFEX lasers," Plasma Physics and Controlled Fusion, 2011, 124029 6 pgs, vol. 53.

LASER FUSION DEVICE AND NUCLEAR FUSION GENERATING METHOD

TECHNICAL FIELD

The present invention relates to a laser fusion device and a nuclear fusion generating method.

BACKGROUND ART

Non patent literatures 1 to 3 disclose techniques related to laser fusion. In the laser fusion described in Non patent literatures 1 to 3, a target is used in which a conical (especially, a bottom surface of a cone is an opening, the inside of the cone is a hollow, and a peak of the cone is not an opening) gold cone is attached to a spherical CD sphere. In the techniques described in Non patent literatures 1 to 3, first a laser for compression is irradiated to an area, in which the gold cone is not attached, on an outer surface of the CD sphere, and plasma is generated in the CD sphere by compressing the CD sphere. After the compression, a laser light for heating is irradiated to an opening of the gold cone, and the plasma in the CD sphere is heated by a high-speed electron generated in the gold cone.

CITATION LIST

Non Patent Literature

Non Patent Literature 1: "Fast heating scalable to laser fusion", R. Kodama et al., Nature Vol. 418 933-934 (29 Aug. 2002)

Non Patent Literature 2: "Fast heating of ultrahigh-density plasma as a step towards laser fusion ignition", R. Kodama et al., Nature Vol. 412 798-802 (23 Aug. 2001)

Non Patent Literature 3: "Fast ignition integrated experiments with Gekko and LFEX lasers", H. Shiraga et al., Plasma Physics And Controlled Fusion 53 (2011) 124029 (6 pp)

SUMMARY OF INVENTION

Technical Problem

In the techniques described in Non Patent Literatures 1 to 3, energy supplied to a target including a gold cone is supplied to plasma positioning at a center of the target via the gold cone. Therefore, in the case of controlling energy actually supplied to the plasma positioning at the center of the target, an effect by the gold cone needs to be considered, and the control becomes complicated. An object of the present invention is, in view of the above issue, to relatively easily control energy to be supplied to plasma positioning at the center of the target.

Solution to Problem

A laser fusion device according to one aspect of the present invention includes a target shell, a chamber, a target shell supply device, a target shell monitoring device, a compression laser output device, a heating laser output device, and a control device. The target shell generates a nuclear fusion reaction. In the chamber, the target shell generates the nuclear fusion reaction. The target shell supply device supplies the target shell to a reference point on an inner side of the chamber. The target shell monitoring device monitors a state of the target shell supplied to the chamber by the target shell supply device. The compression laser output device outputs a compression laser light for compressing the target shell to the target shell. The heating laser output device outputs a heating laser light for heating the target shell to the target shell. The control device controls the target shell supply device, the compression laser output device, and the heating laser output device. The target shell has a hollow spherical shell shape, includes, on an inner side of the target shell, an approximately spherical space demarcated by an inner surface of the target shell, includes at least one through hole connecting an outer side of the target shell and the space on the inner side of the target shell, and includes, on an outer surface of the target shell, an irradiation area to be irradiated with a compression laser light. The compression laser output device includes a compression laser and a condensing optical device for compression. The compression laser outputs a compression laser light for compressing the target shell. The condensing optical device for compression condenses the compression laser light, which is output from the compression laser, toward the irradiation area of the target shell. The heating laser output device includes a heating laser and a condensing optical device for heating. The heating laser outputs a heating laser light for heating the target shell. The condensing optical device for heating condenses the heating laser light, which is output from the heating laser, toward the through hole of the target shell. The control device includes a target shell supply unit, a timing calculation unit, a light condensing unit, and an output unit. The target shell supply unit controls the target shell supply device so as to supply the target shell to the chamber. The timing calculation unit calculates, based on a monitoring result by the target shell monitoring device, an arrival timing at which the target shell supplied by the target shell supply unit arrives at the reference point, and calculates, based on the arrival timing, a compression laser light output timing at which the compression laser outputs a compression laser light and a heating laser light output timing at which the heating laser outputs a heating laser light following the compression laser light output timing. The light condensing unit controls the condensing optical device for compression, based on a monitoring result by the target shell monitoring device, so as to condense the compression laser light, which is output from the compression laser, toward the irradiation area of the target shell at the compression laser light output timing calculated by the timing calculation unit, and controls the condensing optical device for heating, based on the monitoring result by the target shell monitoring device, so as to condense the heating laser light, which is output from the heating laser at the heating laser light output timing calculated by the timing calculation unit, toward the through hole of the target shell. After the condensing optical device for compression and the condensing optical device for heating are controlled by the light condensing unit, the output unit controls the compression laser so as to output a compression laser light at the compression laser light output timing calculated by the timing calculation unit and controls the heating laser so as to output a heating laser light at the heating laser light output timing calculated by the timing calculation unit.

In the laser fusion device according to one aspect of the present invention, a target shell having a hollow spherical shape is used as a target that generates a nuclear fusion reaction. The target shell includes at least one through hole connecting an outer side of the target shell and a space on an inner side of the target shell and guiding a heating laser light to the space on the inner side of the target shell, and the target shell does not include a gold cone. Therefore, the heating laser light is directly guided to the space in the inner side of the target shell by the through hole without using the conventional gold cone. Therefore, an effect by the gold cone is not needed to be considered, and energy to be supplied to plasma positioning at the center of the target shell can be easily controlled.

In the laser fusion device according to one aspect of the present invention, the target shell includes the two through holes, and the two through holes extend along a central axis passing through a center of the target shell and opposes each other across the center. The two through holes are disposed at an opposing position. Therefore, in the case where a laser light is irradiated to the inner side of the target shell from one of the through holes, even if plasma generates in a vicinity of an opening of the through hole by this laser light, an electron, which generates from the plasma, does not collide with a side opposing the opening of the through hole on an inner surface of the target shell. Accordingly, generation of secondary plasma on the inner side of the target shell can be suppressed.

In the laser fusion device according to one aspect of the present invention, the target shell is a polymer including deuterium or tritium. The target shell includes deuterium or tritium, and therefore can generate a nuclear fusion.

A nuclear fusion generating method according to one aspect of the present invention includes a supply process, a preparation process, and an irradiation process. The supply process supplies a target shell, which generates nuclear fusion reaction, to a chamber. The preparation process prepares for irradiation with a compression laser light for compressing the target shell and a heating laser light for heating the target shell after the compression after the supply process. The irradiation process irradiates the target shell with the compression laser light and the heating laser light in sequence after the preparation process. The target shell has a hollow spherical shell shape, includes, on an inner side of the target shell, an approximately spherical space demarcated by an inner surface of the target shell, includes at least one through hole connecting an outer side of the target shell and the space on the inner side of the target shell, and includes, on an outer surface of the target shell, an irradiation area to be irradiated with a compression laser light. The preparation process includes a calculation process and a light condensing process. The calculation process calculates a compression laser light output timing, at which a compression laser light is output, and a heating laser light output timing, at which a heating laser light is output, based on a monitoring result while monitoring a state of the target shell supplied to the chamber on the supply process. Based on the monitoring result, the light condensing process condenses the compression laser light toward the irradiation area of the target shell at the compression laser light output timing and condenses the heating laser light toward the through hole of the target shell at the heating laser light output timing. In the irradiation process, the compression laser light is irradiated to the irradiation area of the target shell at the compression laser light output timing, and the heating laser light is irradiated to the through hole of the target shell at the heating laser light output timing following the irradiation with the compression laser light.

In the nuclear fusion generating method according to one aspect of the present invention, a target shell having a hollow spherical shape is used as a target for generating a nuclear fusion reaction. The target shell includes at least one through hole connecting an outer side of the target shell and a space on an inner side of the target shell and guiding a heating laser light to the space on the inner side of the target shell, and the target shell does not include a gold cone. Therefore, the heating laser light is directly guided to the space in the inner side of the target shell by the through hole without using the conventional gold cone. Therefore, an effect by the gold cone is not needed to be considered, and energy to be supplied to plasma positioning at the center of the target shell can be easily controlled.

In the nuclear fusion generating method according to one aspect of the present invention, the target shell includes the two through holes, and the two through holes extend along a central axis passing through a center of the target shell and opposes each other across the center. The two through holes are disposed at an opposing position. Therefore, in the case where a laser light is irradiated to the inner side of the target shell from one of the through holes, even if plasma generates in a vicinity of an opening of the through hole by this laser light, an electron, which generates from the plasma, does not collide with a side opposing the opening of the through hole on an inner surface of the target shell. Accordingly, generation of secondary plasma on the inner side of the target shell can be suppressed.

In the nuclear fusion generating method according to one aspect of the present invention, the target shell is a polymer including deuterium or tritium. The target shell includes deuterium or tritium, and therefore can generate a nuclear fusion.

Advantageous Effects of Invention

According to one aspect of the present invention, energy to be supplied to plasma positioning at a center of a target can be relatively easily controlled.

DESCRIPTION OF EMBODIMENTS

Figure 1:
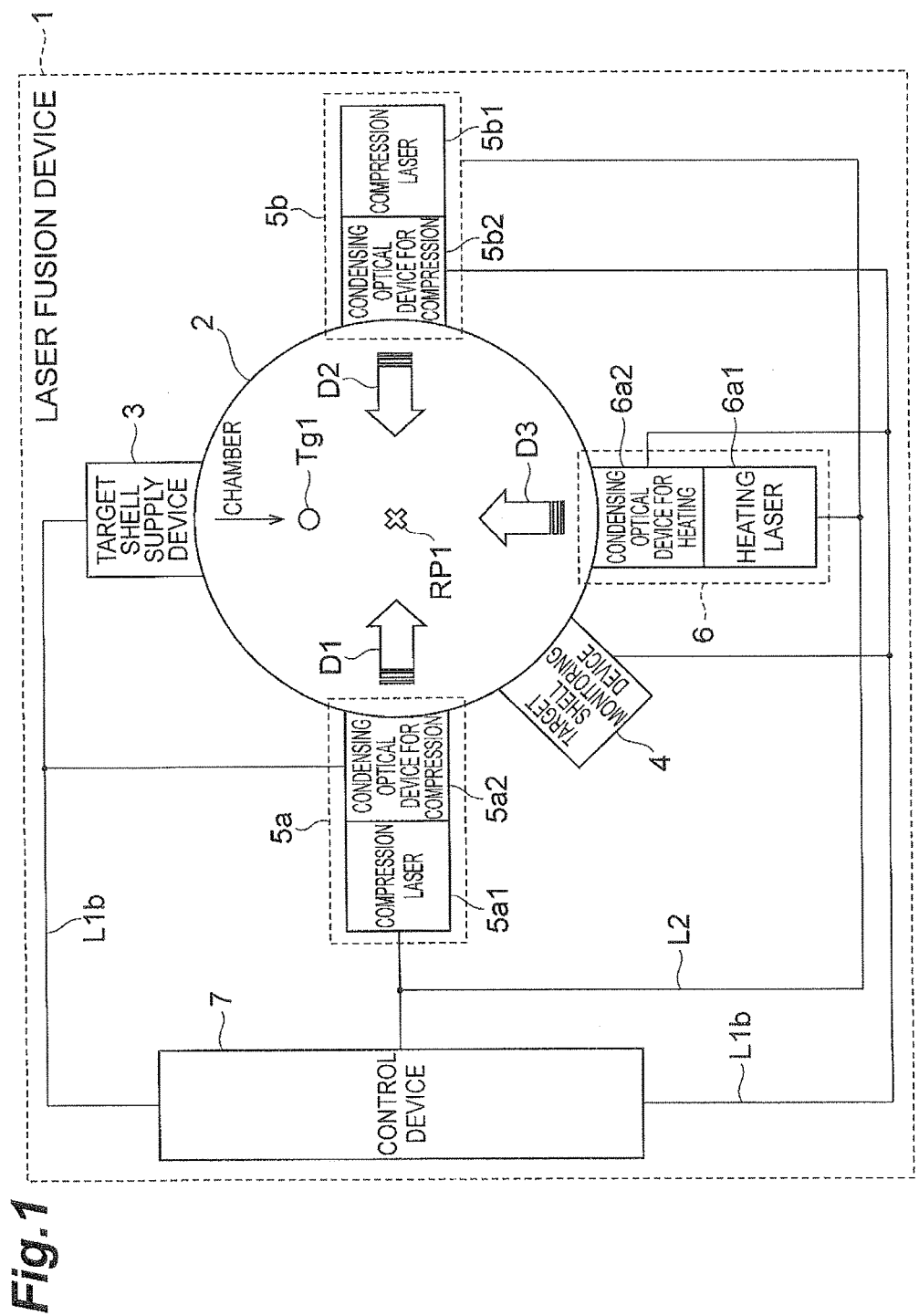
FIG. 1 is a view illustrating a configuration of a laser fusion device according to an embodiment.

A present embodiment will be described below in detail with reference to the accompanying drawings. In descriptions of the drawings, if possible, the same elements are denoted with the same signs, and redundant descriptions are omitted. First, a configuration of a laser fusion device 1 will be described according to the embodiment with reference to FIGS. 1 to 5. FIGS. 1 to 5 are views and diagrams for describing a configuration of the laser fusion device 1.

The laser fusion device 1 includes a chamber 2, a target shell supply device 3, a target shell monitoring device 4, a compression laser output device 5a, a compression laser output device 5b, a heating laser output device 6, a control device 7, and a target shell Tg1. The laser fusion device 1 is a device that generates a nuclear fusion reaction in the target shell Tg1 by irradiating the target shell Tg1 with a laser light.

The chamber 2 provides a space in which the target shell Tg1 generates the nuclear fusion reaction. In other words, the nuclear fusion reaction of the target shell Tg1 is generated on an inner side of the chamber 2 in the embodiment. Air pressure in the chamber 2 is previously reduced and maintained. The chamber 2 includes a supply port capable of supplying the target shell Tg1 from the target shell supply device 3. The chamber 2 includes a plurality of windows passing through a laser light output from each of the compression laser output device 5a, the compression laser output device 5b, and the heating laser output device 6. The chamber 2 includes a window for monitoring, by the target shell monitoring device 4, a state of the target shell Tg1 supplied by the target shell supply device 3. A reference point RP1 is previously set on an inner side of the chamber 2. The reference point RP1 is used as a generation point of a nuclear fusion reaction of the target shell Tg1.

The target shell supply device 3 stores a plurality of target shells Tg1. The target shell supply device 3 supplies the target shell Tg1 to the reference point RP1 on the inner side of the chamber 2.

The target shell monitoring device 4 monitors a state of the target shell Tg1 supplied to the chamber 2 by the target shell supply device 3. The target shell monitoring device 4 includes any of a plurality of two-dimensional high-speed cameras and a plurality of two-dimensional X-ray cameras, and sends, to a control device 7, a plurality of image data sets indicating images of the target shell Tg1, which is imaged by a plurality of two-dimensional high-speed cameras and a plurality of two-dimensional X-ray cameras.

The compression laser output device 5a outputs a compression laser light for compressing the target shell Tg1 to the target shell Tg1 (in a traveling direction D1). The compression laser output device 5b outputs a compression laser light for compressing the target shell Tg1 to the target shell Tg1 (in a traveling direction D2). The compression laser output device 5a includes a compression laser 5a1 and a condensing optical device for compression 5a2. The compression laser output device 5b includes a compression laser 5b1 and a condensing optical device for compression 5b2. The compression laser output device 5a and the compression laser output device 5b have the same configuration. The compression laser 5a1 and the compression laser 5b1 have the same configuration (refer to FIG. 2). The condensing optical device for compression 5a2 and the condensing optical device for compression 5b2 have the same configuration. The compression laser 5a1 and the compression laser 5b1 output a compression laser light for compressing the target shell Tg1 under control of the control device 7. The compression laser light output from the compression laser 5a1 and the compression laser light output from the compression laser 5b1 have the same characteristics.

The condensing optical device for compression 5a2 condenses the compression laser light, which is output from the compression laser 5a1, toward an irradiation area (such as an irradiation area Ar1 illustrated in FIG. 4 and FIG. 5) of the target shell Tg1. The condensing optical device for compression 5b2 condenses the compression laser light, which is output from the compression laser 5b1, toward an irradiation area (such as an irradiation area Ar2 illustrated in FIG. 4 and FIG. 5) of the target shell Tg1. The condensing optical device for compression 5a2 and the condensing optical device for compression 5b2 operate under control of the control device 7. The condensing optical device for compression 5a2 and the condensing optical device for compression 5b2 have the same configuration. Both of the condensing optical device for compression 5a2 and the condensing optical device for compression 5b2 include a plurality of motor-driven mirrors. The position and inclination of a plurality of mirrors are controlled by the control device 7.

A wavelength of a compression laser light is in a range of not less than 300 nanometers [nm] and not more than 1 micrometer [μm]. Energy of the compression laser light is in a range of not less than 1 kilojoule [kJ] and not more than 10 kilojoules [kJ] in every beam of the compression laser light. A time pulse width of the compression laser light is from several hundred picoseconds [ps] to several tens nanoseconds [ns]. Hereinafter, the time pulse width means a time width in which energy of a laser light becomes $1/e^2(=0.135)$ (e=2.718) of peak power. A time wavelength of the compression laser light is a waveform (a tailored pulse waveform) previously set for compressing the target shell Tg1. Peak power of the compression laser light is a value obtained by dividing an energy value by a time pulse width (energy/ time pulse width), and is in a range of not less than 10 gigawatt [GW] and not more than 100 terawatt [TW]. A light condensing diameter of the compression laser light is a diameter of the irradiation area irradiated with one beam of the compression laser light on a surface (an outer surface Sf1) of the target shell Tg1, and the light condensing diameter is from several hundred micrometers [μm] to several millimeters [mm]. A light condensing intensity of the compression laser light is a value obtained by dividing peak power by an area of the irradiation area on a surface of the target shell (peak power/area), and the light condensing intensity is in a range of not less than $1\times10^{11}$ [W/cm$^2$] and not more than $1\times10^{17}$ [W/cm$^2$].

The heating laser output device 6 outputs a heating laser light for heating the target shell Tg1 to the target shell Tg1 (in a traveling direction D3). The heating laser output device 6 includes a heating laser 6a1 and a condensing optical device for heating 6a2.

The heating laser 6a1 outputs a heating laser light for heating the target shell Tg1 under control of the control device 7. A wavelength of the heating laser light is in a range of not less than 800 nanometers [nm] and not more than 1 micrometer [μm]. Energy of the heating laser light is in a range of not less than 1 kilojoule [kJ] and not more than 10 kilojoules [kJ] in every beam of the compression laser light. A time pulse width of the heating laser light is from 100 femtoseconds [fs] to 10 picoseconds [ps]. A time-waveform of the heating laser light is, for example, a Gaussian wave form, or may be other waveform. Peak power of the heating laser light is a value obtained by dividing an energy value by a time pulse width (energy/time pulse width), and the peak power is in a range of not less than 100 terawatt [TW] and not more than 100 petawatt [PW]. A light condensing diameter of the heating laser light is a diameter of the irradiation area irradiated with one beam of the heating laser light on a surface of the target shell Tg1 (an outer surface Sf1, and practically an opening of a through hole H1 of the target shell Tg1), and the light condensing diameter is from several tens micrometers [μm] to several hundred micrometers [μm]. A light condensing intensity of the heating laser light is a value obtained by dividing peak power by an area of the irradiation area on a surface of the target shell (peak power/area), and the light condensing intensity is in a range of not less than $1\times10^{15}$ [W/cm$^2$] and not more than $1\times10^{22}$ [W/cm$^2$].

The condensing optical device for heating 6a2 condenses a heating laser light, which is output from the heating laser 6a1, toward the through hole H1 of the target shell Tg1. The condensing optical device for heating 6a2 operates under control of the control device 7. The condensing optical device for heating 6a2 includes a plurality of motor-driven mirrors. A position and an inclination of a plurality of mirrors are controlled by the control device 7.

The target shell supply device 3 and the condensing optical device for compression 5a2 are connected to the control device 7 via a control signal line L1a. The target shell monitoring device 4, the condensing optical device for compression 5b2, and the condensing optical device for heating 6a2 are connected to the control device 7 via a control signal line L1b. The compression laser 5a1, the compression laser 5b1, and the heating laser 6a1 are connected to the control device 7 via a laser output signal line L2. The control signal line L1a and the control signal line L1b have the same configuration except for a dimension and a shape.

The control device 7 controls the target shell supply device 3, the compression laser output device 5a, the compression laser output device 5b, and the heating laser output device 6. The control device 7 receives image data sent from the target shell monitoring device 4 and performs preset image processing at a preset timing to this image data. Depending on a result of this image processing, the control device 7 controls the target shell supply device 3, the compression laser output device 5a, the compression laser output device 5b, and heating laser output device 6. The control device 7 also controls an operation of the target shell monitoring device 4 (such as ON/OFF, imaging, and transmission of imaged image data).

Figure 2:
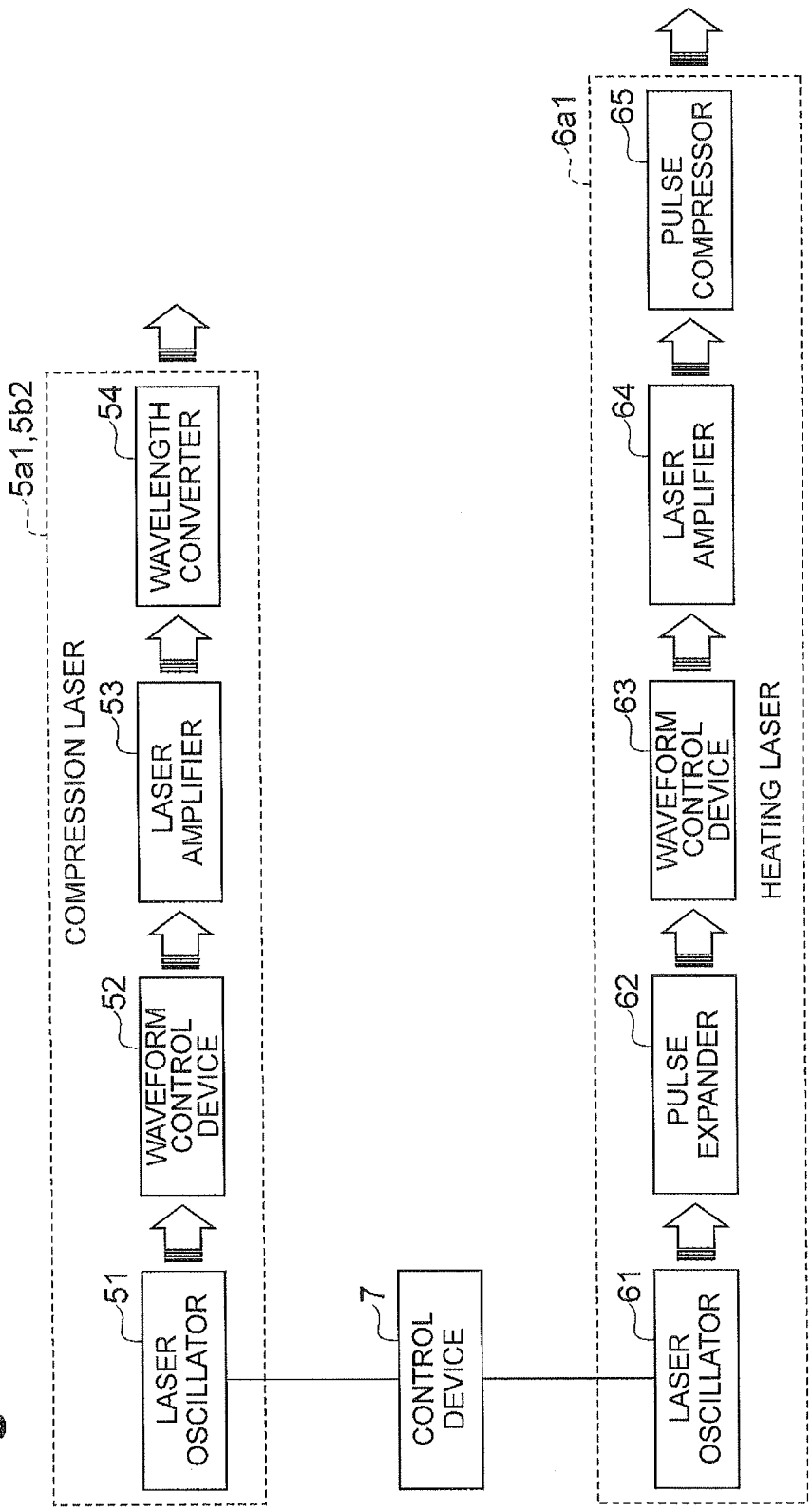
FIG. 2 is a diagram illustrating a configuration of a compression laser and a heating laser according to the embodiment.

A configuration of the compression laser 5a1 and the compression laser 5b1 will be described with reference to FIG. 2. As illustrated in FIG. 2, both of the compression laser 5a1 and the compression laser 5b1 include a laser oscillator 51, a waveform control device 52, a laser amplifier 53, and a wavelength converter 54. The laser oscillator 51 outputs a pulsed laser light for compressing the target shell Tg1. The laser light output from the laser oscillator 51 is formed and amplified as a compression laser light by the waveform control device 52, the laser amplifier 53, and the wavelength converter 54. The waveform control device 52 forms the laser light output from the laser oscillator 51 so as to have a pulse waveform (tailored pulse waveform) suitable for compressing the target shell Tg1, and then outputs the laser light. The laser amplifier 53 amplifies energy of the laser light output from the waveform control device 52. The wavelength converter 54 converts the amplified laser light output from the laser amplifier 53 so as to have a wavelength suitable for compressing the target shell Tg1, and then outputs the laser light as a compression laser light. The laser light output from the wavelength converter 54 is output to the condensing optical device for compression 5a2 in the case of the compression laser output device 5a, and is output to the condensing optical device for compression 5b2 in the case of the compression laser output device 5b.

A configuration of the heating laser 6a1 will be described with reference to FIG. 2. As illustrated in FIG. 2, the heating laser 6a1 includes a laser oscillator 61, a pulse expander 62, a waveform control device 63, a laser amplifier 64, and a pulse compressor 65. The laser oscillator 61 outputs a pulsed laser light for heating the target shell Tg1. A laser light output from the laser oscillator 61 is formed and amplified as a heating laser light by the pulse expander 62, the waveform control device 63, the laser amplifier 64, and the pulse compressor 65. The pulse expander 62 expands a pulse time width of the pulsed laser light output from the laser oscillator 61. A peak intensity of the laser light is reduced by expanding the pulse time width by the pulse expander 62. Therefore, the laser amplifier 64 provided to a rear stage of the pulse expander 62 reduces optical damage on a laser light. The waveform control device 63 forms (for example, suppresses formation of pre-plasma) the laser light output from the laser oscillator 61 so as to have a pulse waveform suitable for heating the target shell Tg1, and then outputs the laser light. The laser amplifier 64 amplifies energy of the laser light output from the waveform control device 63. The pulse compressor 65 shortens a pulse time width of the amplified laser light output from the laser amplifier 64. The peak intensity of the laser light is increased by shortening the pulse time width by the pulse compressor 65. The laser light output from the pulse compressor 65 is input to the condensing optical device for heating 6a2.

Figure 3:
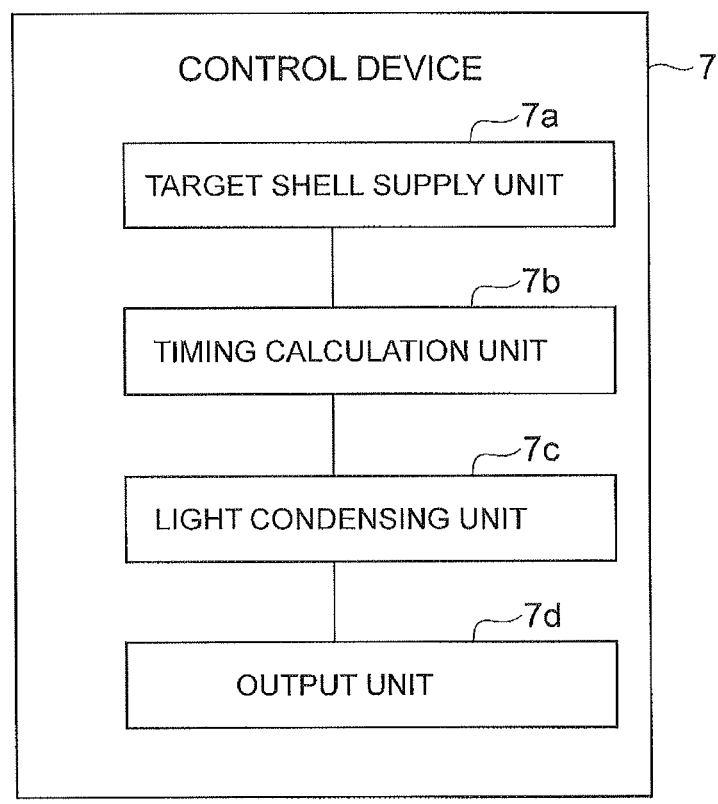
FIG. 3 is a diagram illustrating a functional configuration of a control device according to the embodiment.

A configuration of the control device 7 will be described with reference to FIGS. 3 and 6. The control device 7 physically includes, for example, a CPU, a memory, and a communication device. The CPU of the control device 7 totally controls the control device 7 by executing a computer program stored in the memory of the control device 7. The computer program stored in the memory of the control device 7 is, for example, a computer program for executing the flowchart illustrated in FIG. 6. The memory of the control device 7 stores each data necessary for executing the computer program (for example, data indicating an operation timing of each of the target shell monitoring device 4, the compression laser output device 5a, the compression laser output device 5b, and the heating laser output device 6). The control device 7 functionally includes, for example, a target shell supply unit 7a, a timing calculation unit 7b, a light condensing unit 7c, and an output unit 7d, which are illustrated in FIG. 3. The target shell supply unit 7a, the timing calculation unit 7b, the light condensing unit 7c, and the output unit 7d are functions realized when the CPU of the control device 7 executes the computer program stored in the memory of the control device 7 and operates each configuration unit of the control device 7 illustrated in FIG. 1. The CPU of the control device 7 executes the computer program stored in the memory of the control device 7 and performs processing indicated in the flowchart illustrated in FIG. 6 by using the target shell supply unit 7a, the timing calculation unit 7b, the light condensing unit 7c, and the output unit 7d. The control device 7 follows change in a posture and a position of a target shell (such as the target shell Tg1) moving on an inner side of the chamber 2 by using the target shell supply device 3, the target shell monitoring device 4, the compression laser output device 5a, the compression laser output device 5b, and heating laser output device 6, and the control device 7 can irradiate the target shell with a compressing laser light (such as a compression laser light LS1) and a heating laser light (such as a heating laser light LS3).

The target shell supply unit 7a controls the target shell supply device 3 so as to supply the target shell Tg1 to the reference point RP1 on an inner side of the chamber 2. The timing calculation unit 7b calculates, based on a monitoring result by the target shell monitoring device 4, an arrival timing at which the target shell Tg1 supplied by the target shell supply device 3 arrives at the reference point RP1, and calculates, based on the arrival timing, a compression laser light output timing, at which the compression laser 5a1 and the compression laser 5b1 output compression laser lights, and a heating laser light output timing, at which the heating laser 6a1 outputs a heating laser light, following the compression laser light output timing. The light condensing unit 7c controls, based on a monitoring result by the target shell monitoring device 4, the condensing optical device for compression 5a2 and the condensing optical device for compression 5b2 so as to condense compression laser lights, which is output from the compression laser 5a1 and the compression laser 5b1, toward the irradiation area Ar1 and the irradiation area Ar2 of the target shell Tg1 at the compression laser light output timing calculated by the timing calculation unit 7b. The light condensing unit 7c controls, based on the monitoring result by the target shell monitoring device 4, the condensing optical device for heating 6a2 so as to condense a heating laser light, which is output from the heating laser 6a1, toward the through hole H1 of the target shell Tg1 at the heating laser light output timing calculated by the timing calculation unit 7b. After the light condensing unit 7c controls the condensing optical device for compression 5a2, the condensing optical device for compression 5b2, and the condensing optical device for heating 6a2, the output unit 7d controls the compression laser 5a1 and the compression laser 5b1 so as to output compression laser lights at the compression laser light output timing calculated by the timing calculation unit 7b and controls the heating laser 6a1 so as to output a heating laser light at the heating laser output timing calculated by the timing calculation unit 7b.

Figure 4:
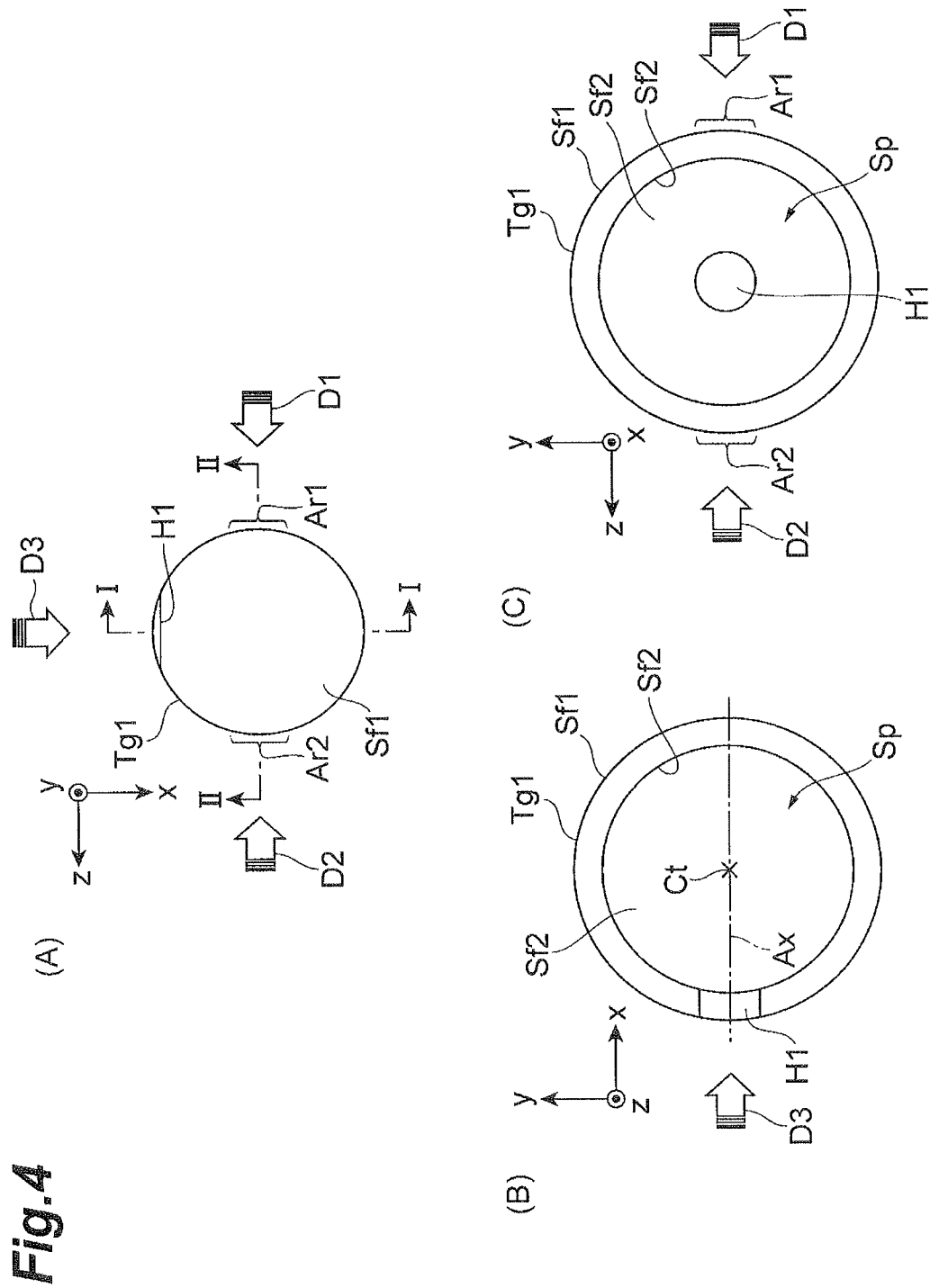
FIG. 4 is a view illustrating configurations of a target shell according to the embodiment.

A configuration of the target shell Tg1 will be described with reference to FIG. 4. Part (A) of FIG. 4 is a view illustrating an appearance of the target shell Tg1. Part (B) of FIG. 4 is a cross-sectional view of the target shell Tg1 along line I-I indicated in Part (A) of FIG. 4. Part (C) of FIG. 4 is a cross-sectional view of the target shell Tg1 along line II-II indicated in Part (A) of FIG. 4. The target shell Tg1 has a hollow spherical shape. The target shell Tg1 includes an outer surface Sf1 and an inner surface Sf2. An approximately spherical space Sp demarcated by an inner surface Sf2 of the target shell Tg1 is provided on an inner side of the target shell Tg1. The target shell Tg1 includes a through hole H1 connecting an outer side of the target shell Tg1 and the space Sp on the inner side of the target shell Tg1. The outer surface Sf1 of the target shell Tg1 includes an irradiation area Ar1 and an irradiation area Ar2 to be irradiated with compression laser lights. The through hole H1 guides the heating laser light LS3 to the space Sp. A target shell such as the target shell Tg1 may further include a plurality of irradiation areas to be irradiated with compression laser lights in addition to the irradiation area Ar1 and the irradiation area Ar2, and may further include one through hole or a plurality of through holes in addition to the through hole H1. The space may be filled with deuterium and tritium which are a liquid or solid state and become a material for a nuclear fusion reaction. Also, the nuclear fusion material may be cooled to a level of 20 Kelvin.

The target shell Tg1 is a polymer including a carbon atom and an atom of at least one type of hydrogen, deuterium, and tritium. For example, the target shell Tg1 is a polymer such as $C_8H_8$, $C_8D_8$, and $C_8T_8$. C denotes a carbon atom. H denotes a hydrogen atom. D denotes a deuterium atom. T denotes a tritium atom. A diameter of the target shell Tg1 is in a range of not less than 100 [µm] and not more than several [mm], and may be in a range of not less than 480 [µm] and not more than 520 [µm], for example. A distant between the outer surface Sf1 and the inner surface Sf2 of the target shell Tg1 (in other words, the thickness of a shell of the target shell Tg1) is in a range of not less than 1 [µm] and not more than 1 [mm], and may be in a range of not less than 6.8 [µm] and not more than 7.2 [µm], for example. A diameter of the through hole H1 is in a range of not less than 10 [µm] and not more than 1 [mm], and may be in a range of not less than 245 [µm] and not more than 255 [µm], for example.

Figure 5:
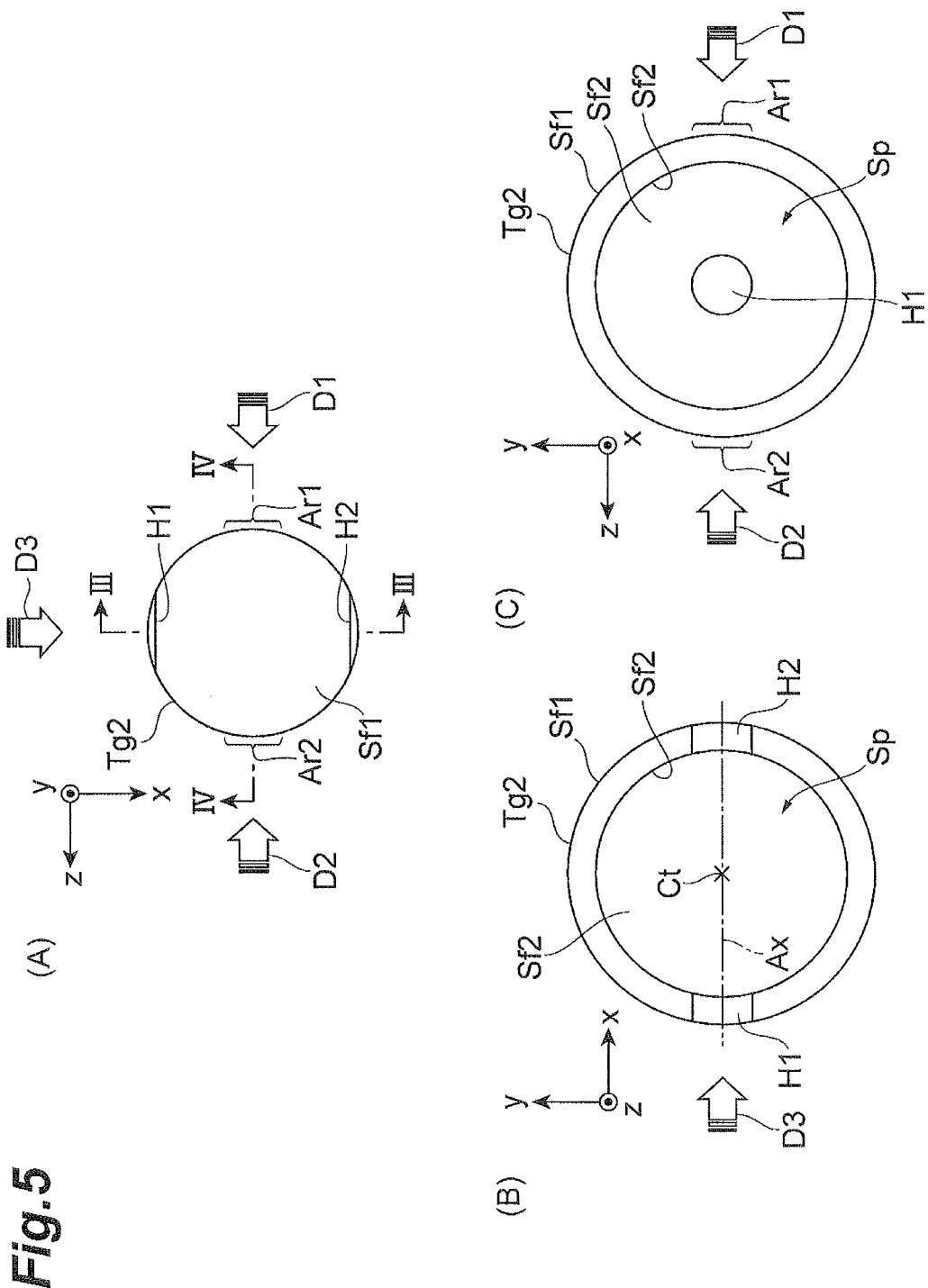
FIG. 5 is a view illustrating other configurations of the target shell according to the embodiment.

A target shell Tg2 illustrated in FIG. 5 may be used instead of the target shell Tg1. Part (A) of FIG. 5 is a view illustrating an appearance of the target shell Tg2. Part (B) of FIG. 5 is a cross-sectional view of the target shell Tg2 along line III-III indicated in Part (A) of FIG. 5. Part (C) of FIG. 5 is a cross-sectional view of the target shell Tg2 along line IV-IV indicated in Part (A) of FIG. 5. The target shell Tg2 further includes a through hole H2 in addition to a configuration of the target shell Tg1. The target shell Tg1 and the target shell Tg2 structurally differ at this point. Specifically, the target shell Tg1 includes the through hole H1, and the target shell Tg2 includes the through hole H1 and the through hole H2. A dimension and a shape of the through hole H1 are the same as a dimension and a shape of the through hole H2. The through hole H1 and the through hole H2 extend along a central axis Ax passing through a center Ct of the target shell Tg2 and oppose each other across the center Ct. Two openings of the through hole H1 cross to the central axis Ax. Two openings of the through hole H2 cross to the central axis Ax.

The target shell Tg1 and the target shell Tg2 respectively include the irradiation area Ar1 to be irradiated with the compression laser light LS1 and the irradiation area Ar2 to be irradiated with the compression laser light LS2. However, three compression laser lights or more may be irradiated, and approximately 1000 compression laser lights can be irradiated. The compression laser lights can be added in every two compression laser lights as a pair, which is oppositely incident on the same axis (the central axis Ax) across the center Ct of the target shell Tg1 like the compression laser light LS1 and the compression laser light LS2. Also, the compression laser light can be added in every light. The same number of the compression laser output devices (corresponding to the compression laser output device 5a and the compression laser output device 5b) as the number of the compression laser lights are provided depending on the number of the compression laser lights.

The target shell Tg1 and the target shell Tg2 may include further through holes in addition to the through hole H1 and the through hole H2. The through holes can be added in every two through holes as a pair, which oppose each other on the same axis (the central axis Ax) across the center Ct of the target shell Tg2 like the through hole H1 and the through hole H2. Also, the through hole can be added in every through hole. Heating laser lights of the number not more than that of the through holes can be supplied. Two heating laser lights or more may be irradiated, and approximately 100 heating laser lights can be irradiated. The same number of the heating laser output devices (corresponding to the heating laser output device 6) as the number of the heating laser lights are provided depending on the number of the heating laser lights.

Next, a nuclear fusion generating method using the laser fusion device 1 will be described with reference to FIG. 6. First, in step S1, the target shell supply unit 7a of the control device 7 controls the target shell supply device 3 and supplies the target shell Tg1, which generates a nuclear fusion reaction, to the chamber 2 (step S1: a supply process).

Following step S1, the timing calculation unit 7b of the control device 7 and the light condensing unit 7c of the control device 7 prepare for irradiation with a compression laser light for compressing the target shell Tg1 and a heating laser light for heating the target shell Tg1 after compression (step S2: a preparation process). Following step S2, the output unit 7d of the control device 7 controls the compression laser 5a1, the compression laser 5b1, and the heating laser 6a1, and irradiates the target shell Tg1 with a compression laser light and a heating laser light in sequence (step S3: an irradiation process). Step S3 will be described in more detail. In step S3, by controlling the compression laser 5a1 and the compression laser 5b1 by the output unit 7d of the control device 7, the compression laser light is irradiated to the irradiation area Ar1 and the irradiation area Ar2 of the target shell Tg1 at a compression laser light output timing calculated by the timing calculation unit 7b in step S2a to be described, and by controlling the heating laser 6a1 by the output unit 7d of the control device 7, the heating laser light is irradiated to the through hole H1 of the target shell Tg1 at a heating laser light output timing calculated by the timing calculation unit 7b in step S2a to be describe and following irradiation of the compression laser light irradiation.

Step S2 further includes step S2a and step S2b. In step S2a, the target shell monitoring device 4 monitors a state of the target shell Tg1 supplied to the chamber 2 by the target shell supply device 3 in step S1, and the timing calculation unit 7b of the control device 7 calculates, based on a monitoring result by the target shell monitoring device 4, a compression laser light output timing, at which the compression laser 5a1 and the condensing optical device for compression 5b2 outputs compression laser lights, and a heating laser light output timing, at which the heating laser 6a1 outputs a heating laser light (step S2a: a calculation process).

In step S2b, the light condensing unit 7c of the control device 7 controls the condensing optical device for compression 5a2 and the condensing optical device for compression 5b2 based on a monitoring result by the target shell monitoring device 4 so as to condense a compression laser light, which is output from the compression laser 5a1, toward the irradiation area Ar1 of the target shell Tg1 at the compression laser light output timing and so as to condense a compression laser light, which is output from the compression laser 5b1, toward the irradiation area Ar2 of the target shell Tg1 at the compression laser light output timing (at the same timing as the compression laser light output timing in the compression laser 5a1). Furthermore, the light condensing unit 7c of the control device 7 controls the condensing optical device for heating 6a2 based on a monitoring result by the target shell monitoring device 4 so as to condense a heating laser light, which is output from the heating laser 6a 1, toward the through hole H1 of the target shell Tg1 at the heating laser light output timing (at a timing following the compression laser light output timing in the compression laser 5a1 and the compression laser 5b1) (step S2b: a light condensing process).

Figure 7:
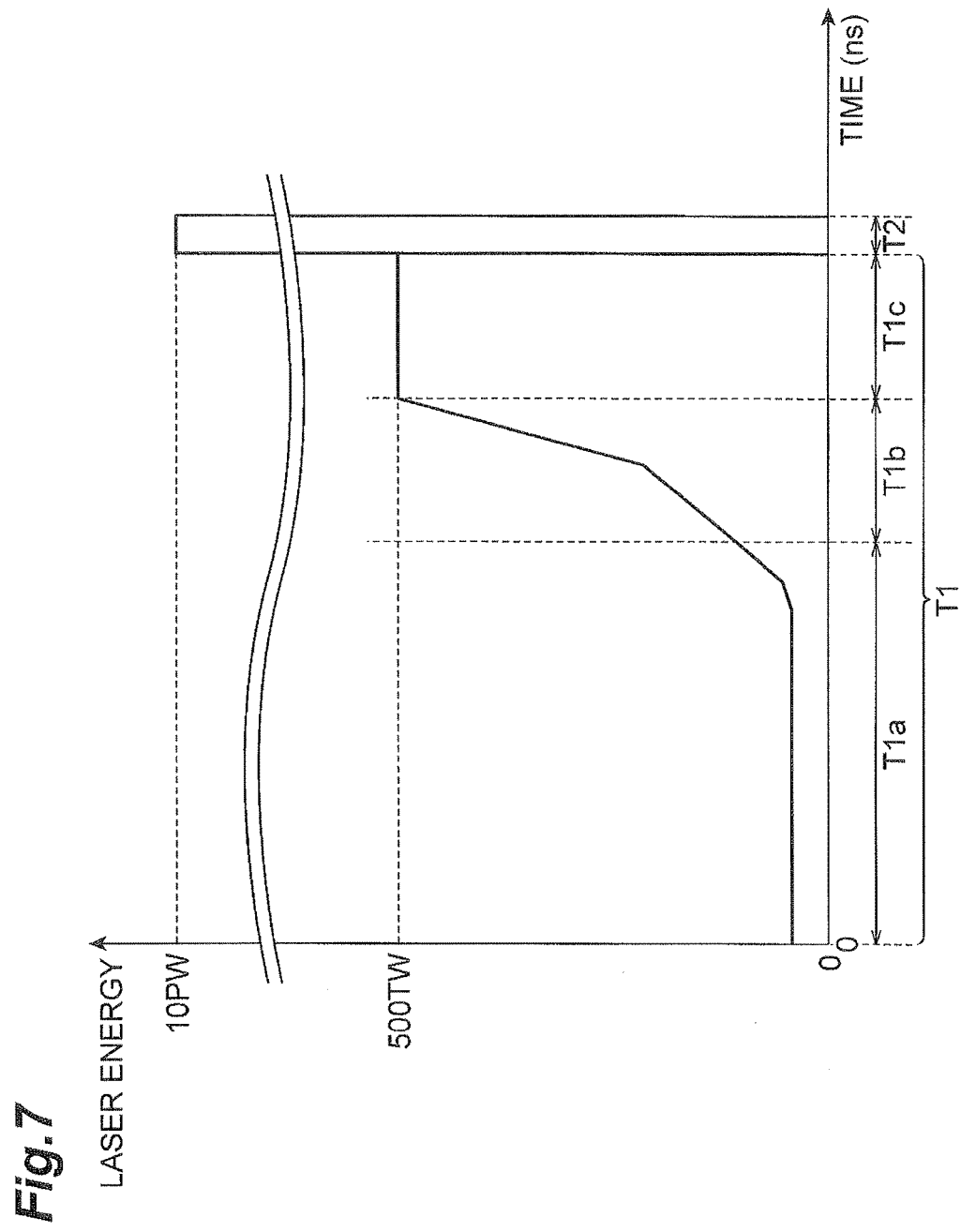
FIG. 7 is a diagram for describing an aspect compressing and heating the target shell in the nuclear fusion generating method according to the embodiment.

Step S3 will be further described in detail with reference to FIGS. 7 and 8. FIG. 7 illustrates a time waveform of energy of a compression laser light (a waveform in a time period T1) and a time waveform of energy of a heating laser light (a waveform in a time period T2). A vertical axis of FIG. 7 indicates an intensity of a laser light. A horizontal axis of FIG. 7 indicates a time at which a laser light is output.

The time period T1 is a time period in which the compression laser light LS1 and the compression laser light LS2 are respectively output by the compression laser 5a1 and the compression laser 5b1 at the same time, and corresponds to the compression laser light output timing calculated by the timing calculation unit 7b. The compression laser light output timing of the compression laser 5a1 and the compression laser light output timing of the compression laser 5b1 are the same (the time period T1). The time period T1 includes a time period T1a, a time period T1b, and a time period T1c in sequence. The time period T1b follows the time period T1a. The time period T1c follows the time period T1b.

The compression laser light LS1 and the compression laser light LS2 in the time period T1a have a relatively low intensity. In the time period T1a, the outer surface Sf1 of the target shell Tg1 is gradually abraded, and plasma P1 is ejected from an outer side of the outer surface Sf1 (refer to Part (A) of FIG. 8). Due to a reaction by which the plasma P1 is ejected from the outer surface Sf1 to the outer side, an inner side (the inner surface Sf1 side) of the target shell Tg1 is compressed toward the center Ct.

At the end the time period T1a, when the target shell Tg1 collects at the center Ct, and a density of the center portion of the target shell Tg1 increases, the reaction toward the inner side of the target shell Tg1 by the ejection of the plasma P1 is decreased, and a compressing action on the target shell Tg1 is decreased. In the time period T1b following the time period T1a, intensities of the compression laser light LS1 and the compression laser light LS2 are instantly increased from the intensity of the compression laser light LS1 and the compression laser light LS2 in the time period T1a, and the compressing action on the target shell Tg1 is increased to further increase the density of the center portion of the target shell Tg1 (refer to Part (B) of FIG. 8). A density of the plasma P1 in the time period T1b is higher than a density of the plasma P1 in the time period T1a. The plasma P1 is not ejected from a portion corresponding to the through hole H1. Therefore, the density of the plasma P1 on the through hole H1 is relatively low in comparison with on an area of the outer surface Sf1 other than the through hole H1.

Figure 8:
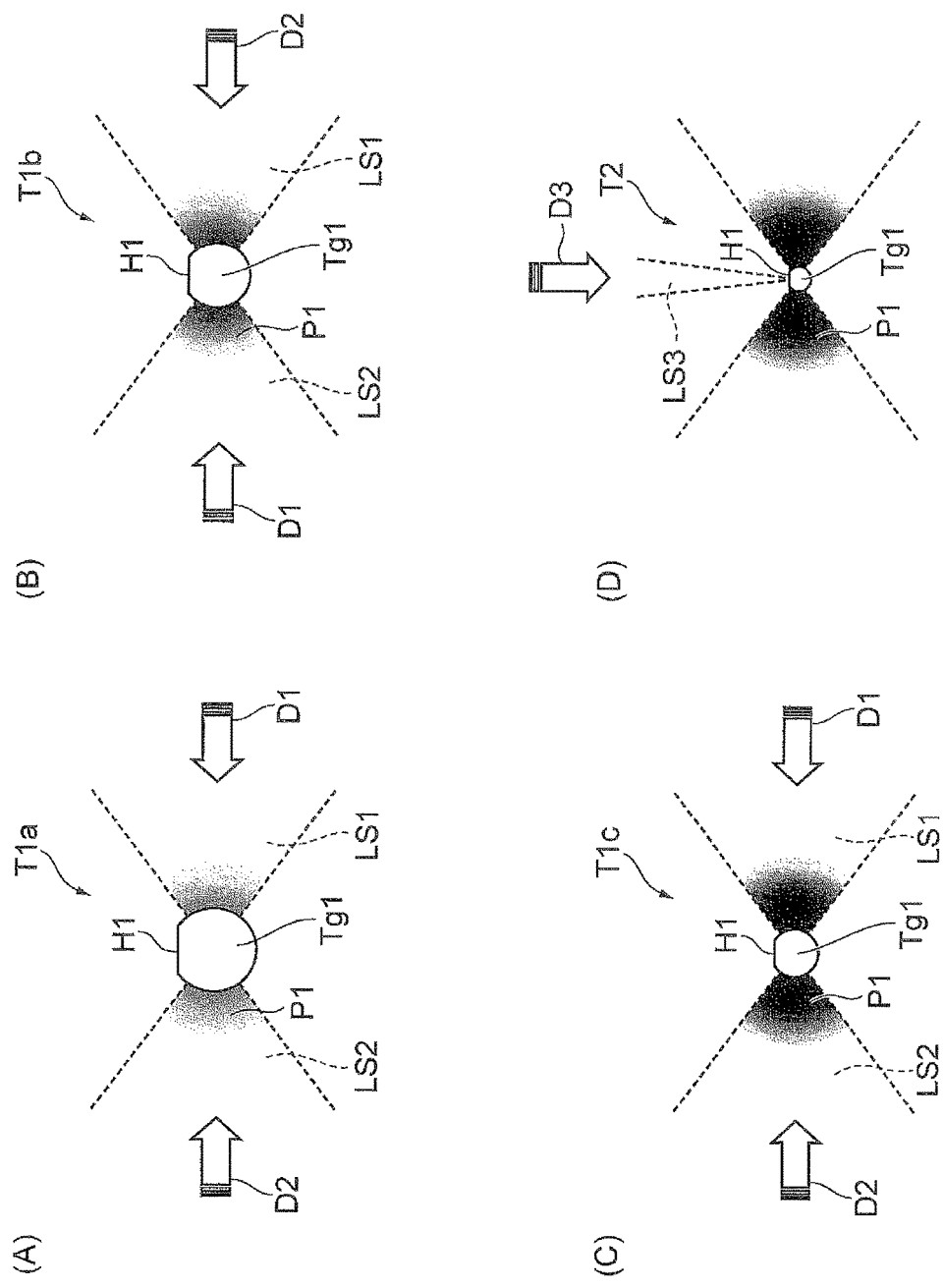
FIG. 8 is a view illustrating aspects in which the target shell is compressed and heated by the nuclear fusion generating method according to the embodiment.

Intensities of the compression laser light LS1 and the compression laser light LS2 in the time period T1c are the maximum intensity of the compression laser light LS1 and the compression laser light LS2 in the time period T1b, and the intensities are maintained at the level (refer to Part (C) of FIG. 8). A density of the plasma P1 in the time period T1c is higher than the density of the plasma P1 in the time period T1a and the time period T1b. As described above, the compression laser light LS1 and the compression laser light LS2 are tailored pulse in which the intensities are instantly increased in the second half of the time period T1 (the time periods T1b and T1c). Plasma (corresponding to plasma P2 indicated in FIG. 9) is generated in the target shell Tg1 by irradiation with the compression laser light LS1 and the compression laser light LS2 in the time period T1.

The time period T2 following the time period T1 is a time period in which the heating laser 6a1 outputs the heating laser light LS3 and corresponds to the heating laser light output timing calculated by the timing calculation unit 7b. The heating laser light LS3 in the time period T2 has high energy in comparison with the compression laser light LS1 and the compression laser light LS2. When the heating laser light LS3 enters in the through hole H1, a high-speed electron and an ion are generated in a vicinity of an opening of the through hole H1 on the inner surface Sf2 side by the heating laser light LS3. The plasma P2 (refer to FIG. 9) in the target shell Tg1, which generates in the time period T1, is heated by the generated high-speed electron and ion, and accordingly a nuclear fusion reaction is caused (refer to Part (D) of FIG. 8).

Figure 9:
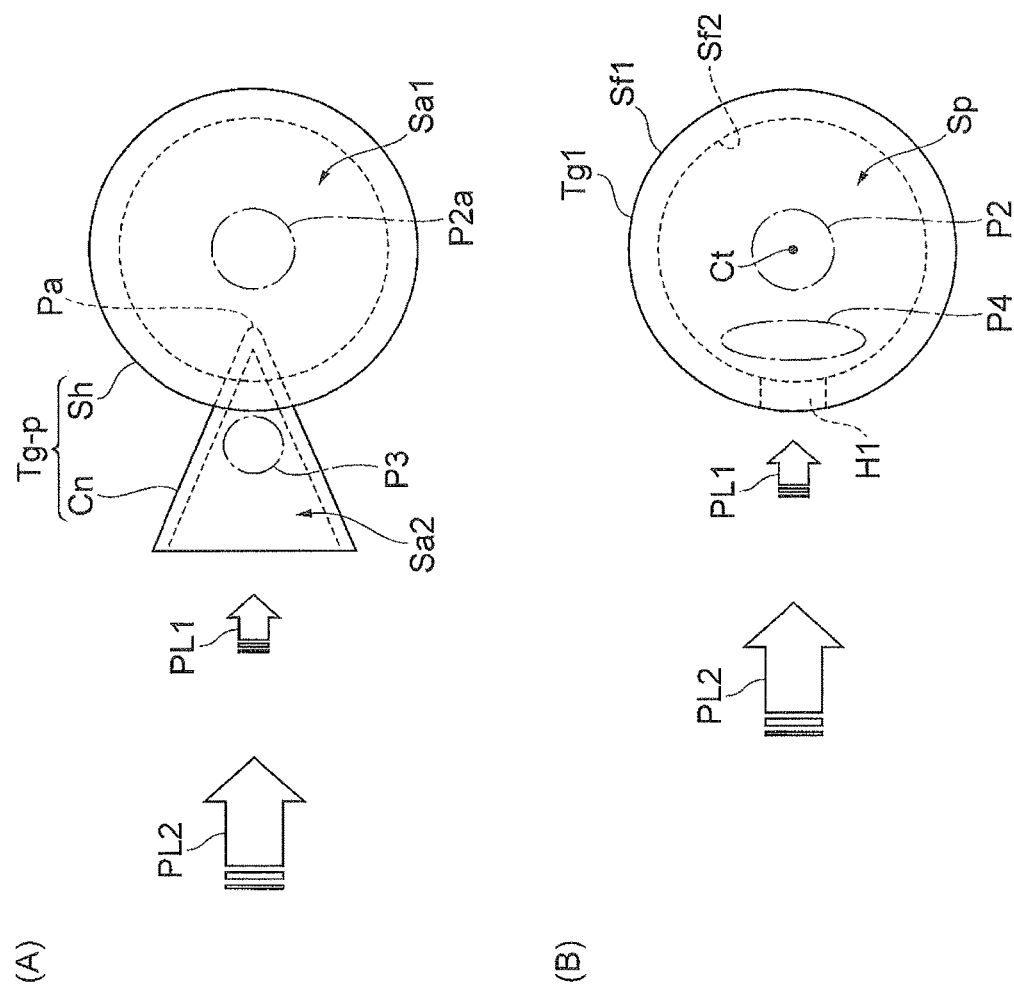
FIG. 9 is a view for describing effects of the embodiment.

Next, the target shell Tg1 will be compared with a conventional target with a gold cone Tg-p with reference to FIG. 9. Part (A) of FIG. 9 illustrates an outline of a configuration of the target with a gold cone Tg-p. Part (B) of FIG. 9 illustrates an outline of a configuration of the target shell Tg1. The target with a gold cone Tg-p includes a gold cone Cn and a CD sphere Sh. The gold cone Cn includes metal such as gold. The CD sphere Sh includes a high polymer including such as carbon (C) and deuterium (D). The gold cone Cn has a conical shape. A space $5a2$ (hollow) is formed on an inner side of the cone (on an inner side surface of the cone). A peak Pa of the cone is closed (not opened). The peak Pa of the gold cone Cn reaches to an inner portion $Sa1$ of the CD sphere Sh. However, the space $5a2$ on an inner side of the gold cone Cn does not reach to the inner portion $Sa1$ of the CD sphere Sh. The heating laser light LS3 sometimes includes a pre-pulse PL1 and a main pulse PL2. The main pulse is generated after the pre-pulse PL1 and has higher energy than that of the pre-pulse PL1. The main pulse PL2 supplies energy for causing a nuclear fusion reaction to a target. When the pre-pulse PL1 generates, in the target with a gold cone Tg-p, plasma P3 is generated by the pre-pulse PL1 in the space Sa2 on the inner side of the gold cone Cn. A part of the main pulse PL2 collides with the plasma P3 generated in the space Sa2 on the inner side of the gold cone Cn by the pre-pulse PL1 before colliding with the gold cone Cn. Therefore, energy supplied from the main pulse PL2 to the plasma $P2a$ (plasma generating at a center of the inner portion $Sa1$ of the CD sphere Sh by compressing the CD sphere Sh) in the space $Sa2$ of the CD sphere Sh is decreased in comparison with a case where the pre-pulse PL1 does not exist.

On the other hand, the target shell Tg1 does not include the conventional gold cone Cn and includes the through hole H1. The pre-pulse PL1 generates plasma P4 in a vicinity of an opening of the through hole H1 on the inner surface Sf2 side in the space Sp on an inner side of the target shell Tg1. A part of or all of the main pulse PL2 irradiated after the pre-pulse PL1 collides with the plasma P4. A high-speed electron generated by the collision (or a part of the main pulse PL2 which avoids collision with the plasma P4 directly) collides with the plasma P2 generated at a center (center Ct) of the target shell Tg1 in the time period T1 and heats the plasma P2 positioning at the center. The plasma P4 is generated at the space Sp on an inner side of the target shell Tg1 by the pre-pulse PL1 in the case of the target shell Tg1. The plasma P4 is closer to plasma positioning at the center of the target (the plasma P2 in the case of the target shell Tg1, and the plasma P2a in the case of the target with a gold cone Tg-p) than the plasma P3 which is generated at the space Sa2 on an inner side of the gold cone Cn by the pre-pulse PL1. Therefore, in the case of the target shell Tg1, much more energy of the main pulse PL2 irradiated after the pre-pulse PL1 is supplied to plasmas positioning at the center of the target than the case of the conventional target with a gold cone Tg-p. Also, in the case of the target shell Tg1, the heating laser light LS3 is directly irradiated to the through hole H1 of the target shell Tg1 without using the gold cone Cn. Therefore, in comparison with the case of the conventional target with a gold cone Tg-p, energy loss by the gold cone Cn is not needed to be considered, and energy supplied to the plasma P2 positioning at the center of the target shell Tg1 can be more accurately and easily controlled. In the case of using the gold cone Cn, acceleration of a gold ion, which is a heavy ion, is difficult, and therefore the ion does not much contribute to heating.

An effect by the pre-pulse PL1 in the case of the target shell Tg1 and an effect by the pre-pulse PL1 in the case of the target shell Tg2 will be compared. In the case of the target shell Tg1, an electron in the plasma P4 (primary plasmas), which generates in a vicinity of an opening of the through hole H1 on the inner surface Sf2 side by the pre-pulse PL1, collides with an area opposing the through hole H1 across the center Ct on the inner surface Sf2. As a result, plasmas (secondary plasmas) further slightly generates and may reach in a vicinity of an opening of the through hole H1 on the inner surface Sf2 side. The main pulse PL2 collides with the slight secondary plasmas together with the primary plasmas directly caused by the pre-pulse PL1. However, an effect by the secondary plasma is much smaller than an effect by the primary plasma, and therefore the effect is smaller than an effect of plasma by the pre-pulse PL1 in the case of the conventional target with a gold cone Tg-p. On the other hand, in the case of the target shell Tg2, the through hole H2 is provided in an area opposing the through hole H1 across the center Ct. Therefore, in contrast to the case of the target shell Tg1, an electron in plasma, which generates in a vicinity of an opening of the through hole H1 on the inner surface Sf2 side by the pre-pulse PL1, does not collide with the inner surface Sf2. Therefore, secondary plasma is not generated.

In the laser fusion device 1 and the nuclear fusion generating method according to the embodiment, the target shell Tg1 having a hollow spherical shape is used as a target for generating a nuclear fusion reaction. The target shell Tg1 includes the through hole H1 connecting an outer side of the target shell Tg1 and the space Sp on an inner side of the target shell Tg1 and guiding the heating laser light LS3 to the space Sp on the inner side of the target shell Tg1, and does not include the gold cone Cn. Therefore, the heating laser light LS3 is directly guided to the space Sp on the inner side of the target shell Tg1 by the through hole H1 without using the conventional gold cone Cn. As a result, an effect by the gold cone Cn is not needed to be considered, and energy to be supplied to the plasma P2 positioning at a center of the space Sp of the target shell Tg1 can be easily controlled.

Furthermore, in the case of the target shell Tg2, the through hole H1 and the through hole H2 are arranged at a position opposing each other. Therefore, in the case where the heating laser light LS3 is irradiated to the space Sp on an inner side of the target shell Tg2 from the through hole H1, even if the plasma P4 is generated in a vicinity of an opening of the through hole H1 by the heating laser light LS3, an electron generated from the plasma P4 does not collide with a side opposing an opening of the through hole H2 on the inner surface Sf2 of the target shell Tg2. Accordingly, generation of a secondary plasma on the inner side of the target shell Tg2 can be suppressed. Both of the target shell Tg1 and the target shell Tg2 include a carbon atom, hydrogen, deuterium, and tritium, and therefore a nuclear fusion can be generated.

EXAMPLE

Figure 10:
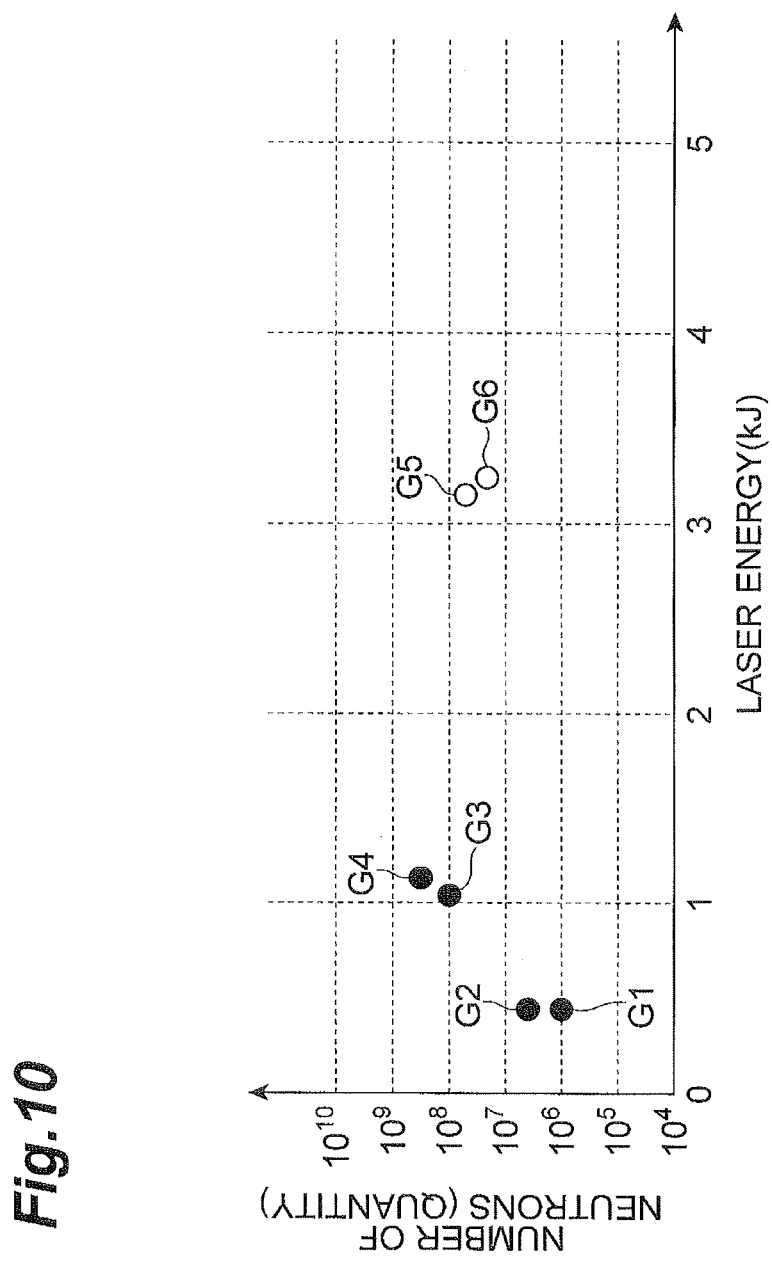
FIG. 10 is a diagram illustrating a state of generation of plasma in the target shell according to the embodiment and a conventional target with a gold cone.

FIG. 10 indicates a measurement result in the case of using an example of the target shell Tg2 (called an example target) and a measurement result in the case of using an example of the conventional target with a gold cone Tg-p (called a conventional target). A horizontal axis in FIG. 10 indicates energy of a laser light irradiated to the example target and the conventional target, and a vertical axis in FIG. 10 indicates a total number of neutrons generated from each of the example target and the conventional target by a nuclear fusion reaction.

Measurement results G1 to G4 indicate measurement results in the case of using the example target. The example target, in which measurement results G1 to G4 are obtained, has approximately 500 [μm] in diameter. A thickness of a shell (corresponding to a distance between the outer surface Sf1 and the inner surface Sf2) is approximately 7 [μm]. Both of a diameter of a through hole corresponding to the through hole H1 and a diameter of a through hole corresponding to the through hole H2 are approximately 250 [μm]. The measurement results G1 to G4 are obtained from two compression laser lights (corresponding to the compression laser light LS1 and the compression laser light LS2). Time pulse widths of both of the two compression laser lights are approximately 1.3 nanoseconds [ns], and energy of both of the two compression laser lights, in which the measurement results G1 to G4 are obtained, is approximately 300 [J]. By irradiating with the two compression laser lights, $1 \times 10^6$ neutrons are measured during an irradiation period of the compression laser lights. Following the irradiation of the compression laser lights, one heating laser light (corresponding to the heating laser light LS3) having a time pulse width of approximately 1.5 picoseconds [ps] and energy of approximately 600 [J] is irradiated for causing a nuclear fusion reaction, and $5 \times 10^8$ neutrons are measured during an irradiation period of the heating laser light (the measurement result G4). Further more, following the irradiation of the compression laser lights, a heating laser light (corresponding to the heating laser light LS3) having a time pulse width of approximately 1.5 picoseconds [ps] and energy of approximately 500 [J] is irradiated for causing a nuclear fusion reaction, and $1 \times 10^8$ neutrons are measured during an irradiation period of the heating laser light (the measurement result G4).

The measurement results G5 and G6 indicate measurement results in the case of using the conventional target. The conventional target, in which the measurement results G5 and G6 are obtained, has a configuration in which the gold cone is inserted into an inner side of the CD sphere so that a distance between a peak of the gold cone and a center of the CD sphere becomes approximately 50 [μm]. A diameter of the spherical CD sphere of the conventional target is approximately 500 [μm]. A thickness of a shell of the CD sphere (a distance between an outer surface and an inner surface of the CD sphere) is approximately 7 [μm]. A wall thickness of the conical gold cone is approximately 10 [μm] to 20 [μm]. Nine to twelve compression laser lights are irradiated to the conventional target. Total energy of the compression laser lights is 1.5 to 4.5 [kJ]. A time pulse width of each of the compression laser lights is 1.5 [ns], Following the irradiation of the compression laser lights, one heating laser light is irradiated to the conventional target. Energy of the heating laser light is 300 [J]. A time pulse width of the heating laser light is 1 picosecond [ps]. A nuclear fusion reaction is generated by irradiating the conventional target with the heating laser light, and maximum $3.5 \times 10^7$ neutrons are measured during an irradiation period of the heating laser light (the measurement results G5 and G6).

Figure 6:
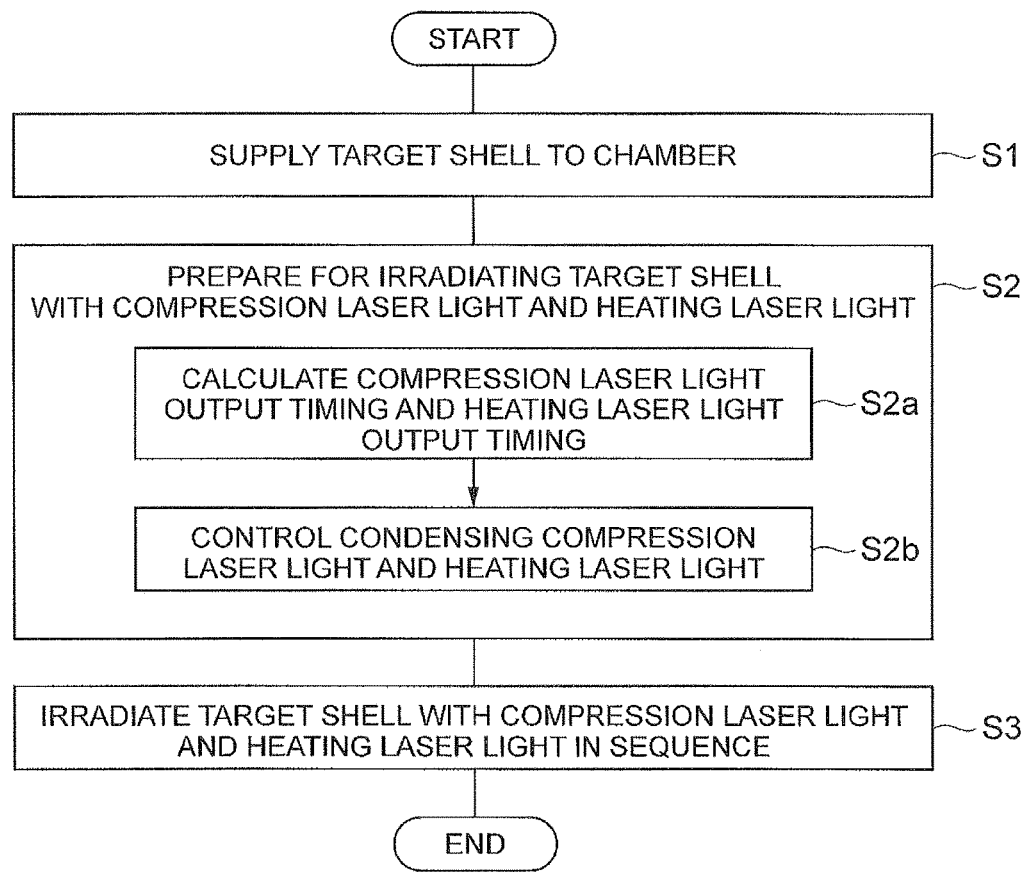
FIG. 6 is a flowchart for describing a nuclear fusion generating method according to the embodiment.

According to the measurement result indicated in FIG. 6, in the case where the example target corresponding to the target shell Tg2 is used, in comparison with the case of using the conventional target with a gold cone, total energy of the irradiated laser lights (total of energy of the compression laser light and energy of the heating laser light) becomes approximately one-third. On the contrary, the total number of generated neutrons exceeds one digit or more.

As above, a principle of the present invention is illustrated and described in the embodiment. An inventor recognizes that the arrangement and the detail in the present invention can be changed without departing from the principle. The present invention is not limited to a specific configuration disclosed in the present embodiment. Therefore, rights of all corrections and changes within the claims and spirits of the present invention are claimed.

INDUSTRIAL APPLICABILITY

The present embodiment is applied to a laser fusion device that controls energy to be supplied to plasma positioning at a center of a target and a nuclear fusion generating method.

REFERENCE SIGNS LIST

1 . . . laser fusion device; 2 . . . chamber; 3 . . . target shell supply device; 4 . . . target shell monitoring device; 51, 61 . . . laser oscillator; 52, 63 . . . waveform control device; 53, 64 . . . laser amplifier; 54 . . . wavelength converter; 5a, 5b . . . compression laser output device; 5a1, 5b1 . . . compression laser; 5a2, 5b2 . . . condensing optical device for compression; 6 . . . heating laser output device; 62 . . . pulse expander; 65 . . . pulse compressor; 6a1 . . . heating laser; 6a2 . . . condensing optical device for heating; 7 . . . control device; 7a . . . target shell supply unit; 7b . . . timing calculation unit; 7c . . . light condensing unit; 7d . . . output unit; Ar1, Ar2 . . . irradiation area; Ax . . . central axis; Cn . . . Gold cone; Ct . . . center; D1, D2, D3 . . . traveling direction; G1, G2, G3, G4, G5, G6 . . . measurement result; H1, H2 . . . through hole; L1a, L1b . . . control signal line; L2 . . . laser output signal line; LS1, LS2 . . . compression laser light; LS3 . . . heating laser light; P1, P2, P2a, P3, P4 . . . plasma; Pa . . . peak; PL1 . . . pre-pulse; PL2 . . . main pulse; RP1 . . . reference point; Sa1 . . . inner portion; Sa2 . . . space; Sf1 . . . outer surface; Sf2 . . . inner surface; Sh . . . CD sphere; Sp . . . space; T1, T1a, T1b, T1c, T2 . . . time period; Tg1, Tg2 . . . target shell; Tg-p . . . target with a gold cone.

What is claimed is:

1. A laser fusion device comprising:
a target shell that generates a nuclear fusion reaction;
a chamber in which the target shell generates the nuclear fusion reaction;
a target shell supply device that supplies the target shell to a reference point on an inner side of the chamber;
a target shell monitoring device that monitors a state of the target shell supplied to the chamber by the target shell supply device;
a compression laser output device that outputs a compression laser light for compressing the target shell to the target shell;
a heating laser output device that outputs a heating laser light for heating the target shell to the target shell; and
a control device that controls the target shell supply device, the compression laser output device, and the heating laser output device, wherein
the target shell has a hollow spherical shell shape, includes, on an inner side of the target shell, a spherical space demarcated by an inner surface of the target shell, includes at least one through hole connecting an outer side of the target shell and the space on the inner side of the target shell, and includes, on an outer surface of the target shell, an irradiation area to be irradiated with a compression laser light, and the compression laser output device includes
- a compression laser that outputs the compression laser light for compressing the target shell; and
- a condensing optical device for compression, that condenses the compression laser light, which is output from the compression laser, toward the irradiation area of the target shell, and the heating laser output device includes
- a heating laser that outputs a heating laser light for heating the target shell; and
- a condensing optical device for heating, that condenses a heating laser light, which is output from the heating laser, toward the through hole of the target shell, and the control device includes
- a target shell supply unit that controls the target shell supply device so as to supply the target shell to the chamber,
- a timing calculation unit that calculates an arrival timing, at which the target shell supplied by the target shell supply unit arrives at the reference point, based on a monitoring result by the target shell monitoring device, and calculate, based on the arrival timing, a compression laser light output timing at which the compression laser outputs the compression laser light and a heating laser light output timing at which the heating laser outputs the heating laser light following the compression laser light output timing,
- a light condensing unit that controls the condensing optical device for compression based on the monitoring result by the target shell monitoring device so as to condense the compression laser light, which is output from the compression laser, toward the irradiation area of the target shell at the compression laser light output timing calculated by the timing calculation unit, and control the condensing optical device for heating based on the monitoring result by the target shell monitoring device so as to condense the heating laser light, which is output from the heating laser at the heating laser light output timing calculated by the timing calculation unit, toward the through hole of the target shell; and
- an output unit that controls the compression laser so as to output a compression laser light at the compression laser light output timing calculated by the timing calculation unit, and control the heating laser so as to output a heating laser light at the heating laser light output timing calculated by the timing calculation unit, after the condensing optical device for compression and the condensing optical device for heating are controlled by the light condensing unit.

2. The laser fusion device according to claim 1, wherein the target shell includes the two through holes, and the two through holes extend along a central axis passing through a center of the target shell and opposes each other across the center.

3. The laser fusion device according to claim 1, wherein the target shell is a polymer including deuterium or tritium.

4. A nuclear fusion generating method comprising:
- a supply process that supplies a target shell, which generates a nuclear fusion reaction, to a chamber;
- a preparation process that prepares for, after the supply process, irradiation with a compression laser light for compressing the target shell and a heating laser light for heating the target shell after compression; and
- an irradiation process that irradiates the target shell with the compression laser light and the heating laser light in sequence after the preparation process, wherein the target shell has a hollow spherical shell shape, includes, on an inner side of the target shell, a spherical space demarcated by an inner surface of the target shell, includes at least one through hole connecting an outer side of the target shell and the space on the inner side of the target shell, and includes, on an outer surface of the target shell, an irradiation area to be irradiated with a compression laser light, and the preparation process includes
- a calculation process that calculates the compression laser light output timing at which a compression laser light is output and the heating laser light output timing at which a heating laser light is output based on a monitoring result while monitoring a state of the target shell supplied to the chamber in the supply process; and
- a light condensing process that condenses, based on the monitoring result, the compression laser light toward the irradiation area of the target shell at the compression laser light output timing and the heating laser light toward the through hole of the target shell at the heating laser light output timing, and in the irradiation process, the compression laser light is irradiated to the irradiation area of the target shell at the compression laser light output timing, and the heating laser light is irradiated to the through hole of the target shell at the heating laser light output timing following the irradiation with the compression laser light.

5. The nuclear fusion generating method according to claim 4, wherein the target shell includes the two through holes, and the two through holes extend along a central axis passing through a center of the target shell and opposes each other across the center.

6. The nuclear fusion generating method according to claim 4, wherein the target shell is a polymer including deuterium or tritium.

* * * * *